(12) United States Patent
Poulin et al.

(10) Patent No.: US 10,197,821 B2
(45) Date of Patent: *Feb. 5, 2019

(54) OPTICAL MODULATOR WITH IMPROVED EFFICIENCY

(71) Applicant: Ciena Corporation, Hanover, MD (US)

(72) Inventors: Michel Poulin, Quebec (CA); Yves Painchaud, Quebec (CA); Alexandre Delisle-Simard, Quebec (CA)

(73) Assignee: Ciena Corporation, Hanover, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/836,514

(22) Filed: Dec. 8, 2017

(65) Prior Publication Data

US 2018/0307062 A1    Oct. 25, 2018

Related U.S. Application Data

(63) Continuation of application No. 15/491,834, filed on Apr. 19, 2017, now Pat. No. 9,841,618.

(51) Int. Cl.
*G02F 1/025*     (2006.01)
*G02F 1/225*     (2006.01)
(Continued)

(52) U.S. Cl.
CPC ............ *G02F 1/025* (2013.01); *G02F 1/0121* (2013.01); *G02F 1/2255* (2013.01);
(Continued)

(58) Field of Classification Search
CPC ...... G02F 1/0121; G02F 1/025; G02F 1/2255; G02F 1/2257; G02F 2001/0154; G02F 2001/212
(Continued)

(56) References Cited

U.S. PATENT DOCUMENTS 8,948,608 B1    2/2015   Pobanz
9,507,237 B2   11/2016   Denoyer
(Continued)

OTHER PUBLICATIONS

Aug. 3, 2018 International Searching Authority, Annex to Form PCT/ISA/206, in the International Application No. PCT/US2018/027262.

*Primary Examiner* — Michael Mooney
(74) *Attorney, Agent, or Firm* — Clements Bernard Walker PLLC; Christopher L. Bernard; Lawrence A. Baratta, Jr.

(57) ABSTRACT

An optical modulator circuit includes first and second electrodes, first and second p-n junction segments (PNJSs), and first and second optical waveguides. The first PNJS includes a first modulating p-n junction (MPNJ) in series with a first non-modulating device (NMD) that are connected to the first and second electrodes, respectively, where the first NMD includes a first substantially larger capacitance than the first MPNJ. The second PNJS includes a second NMD in series with a second MPNJ that are connected to the first and second electrodes, respectively, where the second NMD includes a second substantially larger capacitance than the second MPNJ. The first and second optical waveguides superimpose the first and second MPNJs, respectively, where the first and second MPNJs are configured to modulate a refractive index of the first and second optical waveguides, respectively, based on the substantially larger capacitance of the first NMD and the second NMD.

20 Claims, 8 Drawing Sheets

(51) Int. Cl.
  *G02F 1/01*   (2006.01)
  *G02F 1/21*    (2006.01)
  *G02F 1/015*   (2006.01)

(52) U.S. Cl.
  CPC .... *G02F 1/2257* (2013.01); *G02F 2001/0154* (2013.01); *G02F 2001/212* (2013.01)

(58) Field of Classification Search
  USPC .......................... 385/1–10, 14; 398/187–188
  See application file for complete search history.

(56) References Cited

U.S. PATENT DOCUMENTS

| | | | |
|---|---|---|---|
| 9,841,618 B1* | 12/2017 | Poulin | G02F 1/025 |
| 2013/0343693 A1* | 12/2013 | Doerr | G02F 1/011 |
| | | | 385/3 |
| 2015/0062689 A1 | 3/2015 | Doerr | |
| 2015/0286108 A1 | 10/2015 | Prosyk | |
| 2016/0085133 A1* | 3/2016 | Denoyer | H04B 10/556 |
| | | | 385/3 |
| 2017/0075187 A1* | 3/2017 | Aimone | G02F 1/2255 |

* cited by examiner

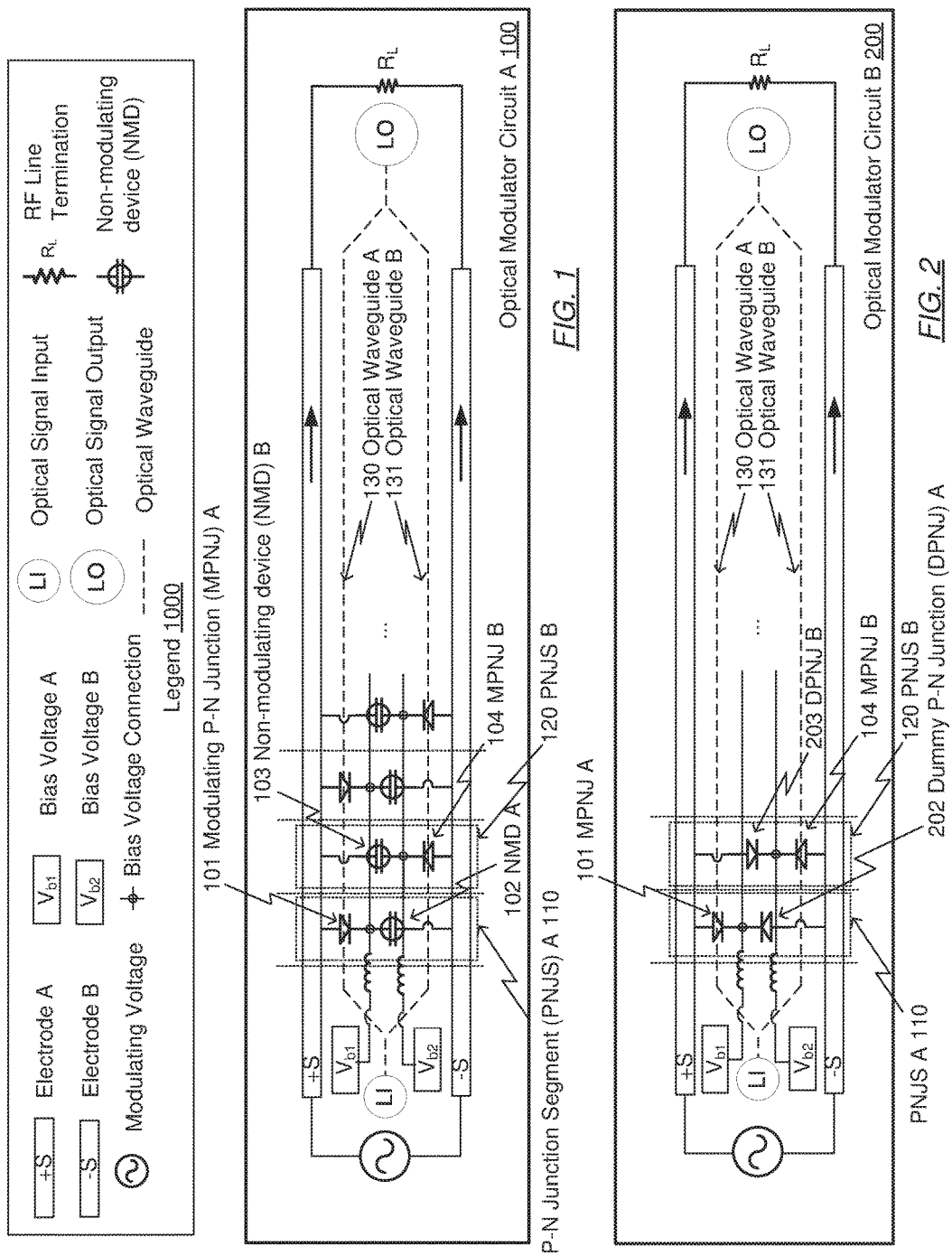

OPTICAL MODULATOR WITH IMPROVED EFFICIENCY

CROSS REFERENCE TO RELATED APPLICATIONS

This application is a continuation application of U.S. Pat. No. 9,841,618, filed on Apr. 19, 2017, and entitled "OPTICAL MODULATOR WITH IMPROVED EFFICIENCY." Accordingly, this application claims benefit of U.S. Pat. No. 9,841,618 under 35 U.S.C. § 120. U.S. Pat. No. 9,841,618 is hereby incorporated in its entirety.

BACKGROUND

An electronic component is a component that conducts, transmits, receives, generates, or otherwise uses an electrical current and/or signal during the operation of the component. An optoelectronic component is an electronic component that also uses an optical signal during operation. An optoelectronic integrated circuit is a set of optoelectronic components on one small flat piece referred to as a "chip", which is created from a batch fabrication process using a wafer. The wafer may include semiconductor material (e.g., silicon) overlaid with additional material layers (e.g., metal, oxide, etc.) to simultaneously fabricate a large number of the optoelectronic integrated circuits. Subsequent to the wafer fabrication, multiple optoelectronic integrated circuits are separated into chips for final packaging. The layout of the optoelectronic integrated circuit is the designed placement of planar geometric component shapes of the optoelectronic integrated circuit. A fabrication pattern of the optoelectronic integrated circuit is the pattern of semiconductor, oxide, metal, or other material layers formed on a wafer, die, and/or chip based on the layout. Misalignment is the shifting among layers in the fabrication pattern with respect to the layout.

A p-n junction is a boundary or interface between a p-type region and an n-type region of semiconductor material. The p-type region and the n-type region (referred to as doped regions) are created by selectively doping (e.g., via an ion implantation process, diffusion process, epitaxy process, etc.) the semiconductor material using a p-type dopant or an n-type dopant, respectively. The fabrication pattern of the p-type region and the n-type region is based on one or more lithographic masks used to perform the selective doping. In a reverse biased condition, the p-n junction is electrically equivalent to a capacitor in series with a resistor. In particular, the capacitance depends on the depletion width and the resistance depends on the geometry of the doped regions. The p-n junction and associated doped regions form a diode.

A waveguide is an optoelectronic component having a physical structure that confines and guides the propagation of an electromagnetic (EM) wave, e.g., as an optical signal. A mode is an electromagnetic (EM) field pattern in the waveguide. The fabrication pattern of the waveguide corresponds to the physical structure and is based on one or more lithographic masks used to form the physical structure.

SUMMARY

In general, in one aspect, the invention relates to an optical modulator circuit that includes first and second electrodes, first and second p-n junction segments (PNJSs), and first and second optical waveguides. The first PNJS includes a first modulating p-n junction (MPNJ) in series with a first non-modulating device (NMD) that are connected to the first and second electrodes, respectively, where the first NMD includes a first substantially larger capacitance than the first MPNJ. The second PNJS includes a second NMD in series with a second MPNJ that are connected to the first and second electrodes, respectively, where the second NMD includes a second substantially larger capacitance than the second MPNJ. The first and second optical waveguides superimpose the first and second MPNJs, respectively, where the first and second MPNJs are configured to modulate a refractive index of the first and second optical waveguides, respectively, based on the substantially larger capacitance of the first NMD and the second NMD.

In general, in one aspect, the invention relates to an optical modulator circuit that includes first, second, and center electrodes, first and second p-n junction segments (PNJSs), and first and second optical waveguides. The first PNJS includes a first modulating p-n junction (MPNJ) in series with a first dummy p-n junction (DPNJ) that are connected to the center electrode and the first electrode, respectively, where the first DPNJ includes a first substantially larger capacitance than the first MPNJ. The second PNJS includes a second DPNJ in series with a second MPNJ that are connected to the center electrode and the second electrode, respectively, where the second DPNJ includes a second substantially larger capacitance than the second MPNJ. The first and second optical waveguides superimpose the first and second MPNJs, respectively, where the first and second MPNJs are configured to modulate a refractive index of the first and second optical waveguides, respectively, based on the substantially larger capacitance of the first DPNJ and the second DPNJ.

In general, in one aspect, the invention relates to a method for an optical modulator circuit. The method includes propagating, by a first electrode and a second electrode, a modulating voltage to a first voltage divider circuit comprising a first modulating p-n junction (MPNJ) and a first NMD that are connected to the first electrode and the second electrode, respectively, receiving, by the first MPNJ, a first majority portion of the modulating voltage based on the first NMD comprising a first substantially larger capacitance than the first MPNJ, modulating, by the first MPNJ using the first majority portion of the modulating voltage, a refractive index of a first optical waveguide superimposing the first MPNJ, further propagating, by the first electrode and the second electrode, the modulating voltage to a second voltage divider circuit comprising a second NMD and a second MPNJ that are connected to the first electrode and the second electrode, respectively, receiving, by the second MPNJ, a second majority portion of the modulating voltage based on the second NMD comprising a second substantially larger capacitance than the second MPNJ, modulating, by the second MPNJ using the second majority portion of the modulating voltage, the refractive index of a second optical waveguide superimposing the second MPNJ, and encoding, based on the first MPNJ and the second MPNJ modulating the refractive indices, an optical signal propagating along the first optical waveguide and the second optical waveguide, wherein the optical signal is encoded with information contained in the modulating voltage.

Other aspects of the invention will be apparent from the following description and the appended claims.

BRIEF DESCRIPTION OF DRAWINGS

FIGS. 1, 2, 3A, 3B, 4, 5, 6, 7, and 8 show schematic diagrams in accordance with one or more embodiments of the invention.

DETAILED DESCRIPTION

Figure 3A:
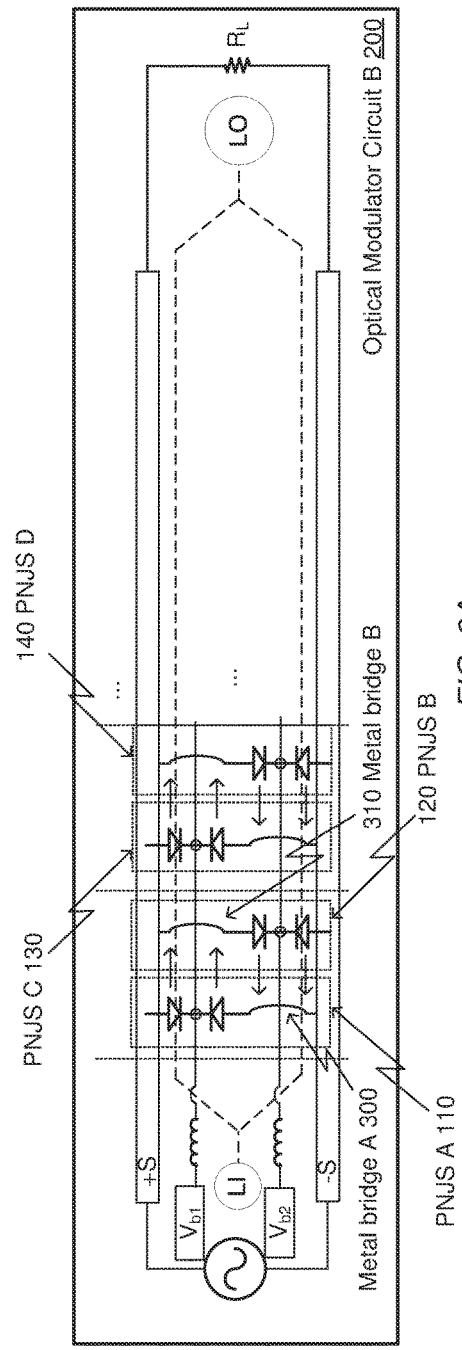

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description, any component described with regard to a figure, in various embodiments of the invention, may be equivalent to one or more like-named components described with regard to any other figure. For brevity, at least a portion of these components is implicitly identified based on various legends. Further, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure. In the figures, three black solid collinear dots indicate that additional components similar to the components before and after the solid collinear dots may optionally exist.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention provide an optical modulator circuit having a first electrode and a second electrode that propagate a modulating voltage to a first p-n junction segment (PNJS) and a second PNJS. The first PNJS and the second PNJS are superimposed by a first waveguide and a second waveguide of the optical modulator circuit respectively.

The first PNJS includes a first modulating p-n junction (MPNJ) in series with a non-modulating device (NMD) to receive the modulating voltage. In particular, the first MPNJ is connected to the first electrode while the first NMD is connected to the second electrode. In one or more embodiments, the first NMD has a substantially larger capacitance than the first MPNJ, thus causing the first MPNJ to receive a majority portion of the modulating voltage.

The second PNJS includes a second NMD in series with a second MPNJ to receive the modulating voltage. In particular, the second NMD is connected to the first electrode while the second MPNJ is connected to the second electrode. In other words, the first PNJS and the second PNJS are connected in opposite configurations. In one or more embodiments, the second NMD has a substantially larger capacitance than the second MPNJ, thus causing the second MPNJ to receive a majority portion of the modulating voltage.

The first optical waveguide and the second optical waveguide propagate an optical signal of the optical modulator circuit. In one or more embodiments of the invention, the first MPNJ and the second MPNJ modulate the refractive index of the first optical waveguide and the second optical waveguide based on the modulating voltage.

In one or more embodiments of the invention, the NMD includes a capacitor. In one or more embodiments of the invention, the NMD includes a p-n junction.

FIG. 1 shows a diagram of an optical modulator circuit A (100) in accordance with one or more embodiments of the invention. In particular, the optical modulator circuit A (100) is depicted according to the legend (1000). In one or more embodiments of the invention, one or more of the elements shown in FIG. 1 may be omitted, repeated, and/or substituted. Accordingly, embodiments of the invention should not be considered limited to the specific arrangements of modules shown in FIG. 1.

As shown in FIG. 1, the optical modulator circuit A (100) includes a p-n junction segment (PNJS) A (110) and a PNJS B (120) that are connected between an electrode A and an electrode B. The optical modulator circuit A (100) further includes an optical waveguide A (130) and optical waveguide B (131) that superimpose the PNJS A (110) and PNJS B (120). In one or more embodiments, the electrode A and electrode B are configured to receive a modulating voltage when the optical modulator circuit A (100) is powered on and in operation. In addition, the PNJS A (110) and PNJS B (120) include respective bias voltage connections that are configured to receive separate bias voltages when the optical modulator circuit A (100) is powered on and in operation. In particular, the two bias voltage connections of the PNJS A (110) and PNJS B (120) are independent of each other and not connected together within the optical modulator circuit A (100). Further, the optical waveguide A (130) and optical waveguide B (131) are configured to receive an optical signal input and generate an optical signal output when the optical modulator circuit A (100) is powered on and in operation. In particular, the optical signal is split into two separate beams at the optical signal input to propagate separately along the two optical waveguides before being recombined (i.e., merged) together at the optical signal output. In one or more embodiments, the optical modulator circuit A (100) is an optoelectronic integrated circuit where the PNJS A (101), PNJS B (102), electrode A, electrode B, optical waveguide A (130), optical waveguide B (131), etc. are integrated on a chip or dice. In particular, the PNJS A (101), PNJS B (102), optical waveguide A (130), and optical waveguide B are superimposed in one or more material layers of the chip or dice.

Specifically, a PNJS is an electronic component having a modulating p-n junction (MPNJ) and a non-modulating device (NMD) connected in series at the bias voltage connection of the PNJS. Accordingly, the PNJS is a voltage divider circuit dividing the modulating voltage among the MPNJ and the NMD. In particular, an alternative current (AC) or time-varying portion of the modulating voltage is divided according to a capacitance ratio of the MPNJ and the NMD. When the optical modulator circuit A (100) is powered on and in operation, the MPNJ may be reverse biased or forward biased based on the bias voltage received at the bias voltage connection.

In one or more embodiments of the invention, within one or more PNJS of the optical modulator circuit A (100), the NMD includes a substantially larger capacitance than the MPNJ. For example, the capacitance of the MPNJ may include the reverse biased or forward biased p-n junction capacitance. Throughout this disclosure, the term "substantially larger" means more than 2 times larger, such as 10 times larger, 100 times larger, etc. For example, the PNJS A (110) includes a MPNJ A (101), connected to the electrode A, in series with a NMD A (102) connected to the electrode B. In one or more embodiments, the capacitance of the NMD A (102) is at least 10 times larger than the capacitance of the MPNJ A (101). Further, the PNJS B (120) includes a NMD B (103), connected to the electrode A, in series with a MPNJ B (104) connected to the electrode B. In one or more embodiments, the capacitance of the NMD B (103) is at least 10 times larger than the capacitance of the MPNJ B (104). In one or more embodiments, the PNJS A (110) is one of a group of PNJSs of the optical modulator circuit A (100) that have respective MPNJs connected to the electrode A. Further, the PNJS B (120) is one of another group of PNJSs of the optical modulator circuit A (100) that have respective MPNJs connected to the electrode B. For example, the two groups of PNJSs are shown in FIG. 1 to be disposed interstitial to each other along a longitudinal direction denoted by arrows in the electrode A and electrode B. In other words, the two groups of PNJSs form a sequence where the MPNJs alternates between (i) connecting to the electrode A and superimposing the optical waveguide A, and (ii) connecting to the electrode B and superimposing the optical waveguide B.

In one or more embodiments, the electrode A and electrode B are configured to propagate the modulating voltage along the longitudinal direction. For example, the electrode A and electrode B may form a coplanar strip waveguide as a radio frequency (RF) traveling-electrode for propagating the modulating voltage. In one or more embodiments, the electrode A, electrode B, optical waveguide A, and optical waveguide B are substantially parallel to each other and form two arms of the optical modulator circuit A (100). In particular, the electrode A and the optical waveguide A form one arm referred to as the arm A. Similarly, the electrode B and the optical waveguide B form another arm referred to as the arm B. Although the electrode A, electrode B, optical waveguide A, and optical waveguide B are shown as straight lines in FIG. 1, the electrode A, electrode B, optical waveguide A, and optical waveguide B may be folded in multiple sections, formed according to a curvilinear configuration, or disposed in other geometry shapes without deviating from the substantially parallel form factor.

In one or more embodiments, the electrode A and electrode B propagate the modulating voltage to the PNJS A (110) and PNJS B (120) for modulating the refractive index of the optical waveguide A (130) and optical waveguide B (131). In one or more embodiments, the modulating voltage has a time-varying magnitude to modulate the free carrier density in the depletion regions of the PNJS A (110) and PNJS B (120). The free carrier density in turn modulates, by varying the refractive index in the depletion regions, the phase of an optical signal propagating from the optical signal input to the optical signal output along the optical waveguide A (130) and optical waveguide B (131). By merging the optical waveguide A (130) and optical waveguide B (131) in an interferometer configuration, the optical signal output is encoded with information contained in the modulating voltage. In one or more embodiments, the information contained in the modulating voltage corresponds to input data encoded in time-varying the magnitude of the modulating voltage.

Continuing with the discussion of FIG. 1, the waveguide A superimposes the MPNJ A (101) while the waveguide B superimposes the MPNJ B (104). In particular, the NMD A (102) and NMD B (103) are not superimposed or otherwise overlapped by the waveguide A and/or the waveguide B. In one or more embodiments, by way of the superimposition, the MPNJ A (101) is configured to modulate the refractive index of the optical waveguide A (130) based on the substantially larger capacitance of the NMD A (102). Specifically, the substantially larger capacitance of the NMD A (102) causes the MPNJ A (101) to receive a majority portion of the modulating voltage. Accordingly, the MPNJ A (101) modulates the refractive index of the optical waveguide A (130) with increased efficiency. As used herein, the majority portion is a portion larger than 50%. In one or more embodiments, the majority portion is 90% or larger. In one or more embodiments, the majority portion of the modulating voltage received by the MPNJ A (101) is an alternating current (AC) portion denoted by $V_{modulating,MPNJ}$ in Eq. 1 below, $$V_{modulating,MPNJ} = \frac{C_{NMD}}{C_{MPNJ} + C_{NMD}} V_{modulating} \qquad \text{Eq. 1}$$

where $C_{NMD}$ is the capacitance of the NMD A (102), $C_{MPNJ}$ is the capacitance of the MPNJ A (101), and $V_{modulating}$ is the time-varying magnitude (i.e., AC magnitude) of the modulating voltage. In the limit that $C_{NMD} \gg C_{MPNJ}$, essentially all the modulating voltage appears across the MPNJ A (101) (i.e., $V_{modulating,MPNJ} = V_{modulating}$), thus maximizing the modulation efficiency for the arm A.

Similarly, the MPNJ B (104) is configured to modulate the refractive index of the optical waveguide B (131) based on the substantially larger capacitance of the NMD B (103). Specifically, the substantially larger capacitance of the NMD B (103) causes the MPNJ B (104) to receive a majority portion of the modulating voltage. Accordingly, the MPNJ B (101) modulates the refractive index of the optical waveguide B (131) with increased efficiency according to the formula above. Based on the foregoing, the PNJS A (110) and PNJS B (120) are connected to the electrode A and the electrode B in opposite directions. As used herein, the direction of the PNJS points from the MPNJ to the NMD. Accordingly, the PNJS A (110) and PNJS B (120) form a pair of voltage divider circuit to modulate the refractive indices of the optical waveguide A and optical waveguide B in a series-push-pull (SPP) configuration. Collectively, the majority portions of the modulating voltage received by the MPNJ A (101) and MPNJ B (104) improves the efficiency of the optical modulator circuit A (100).

In one or more embodiments of the invention, one or more NMDs of the optical modulator circuit A (100) include a capacitor. In the embodiments where the optical modulator circuit A (100) is an optoelectronic integrated circuit, the capacitor of the NMD may be fabricated using metal layers that form two capacitor plates separated by a dielectric layer. In one or more embodiments, the electrode A and one of the two capacitor plates are fabricated using the same metal layer to increase packing density and decrease layout size of the NMD. In one or more embodiments, the capacitors have the shape of a parallellogram in order to minimize RF mode mismatch and reflection along the RF traveling-electrodes.

In one or more embodiments of the invention, one or more NMDs of the optical modulator circuit A (100) include a p-n junction that has a capacitance substantially larger than that of an associated MPNJ. Embodiments using a p-n junction as the NMD in the optical modulator circuit A (100) are described in reference to FIGS. 2-8 and 10-12 below.

FIG. 2 shows a diagram of an optical modulator circuit B (200) in accordance with one or more embodiments of the invention. The legend (1000) shown in FIG. 1 is applicable to FIG. 2. In particular, the optical modulator circuit B (200) is depicted according to the legend (1000). In one or more embodiments of the invention, one or more of the elements shown in FIG. 2 may be omitted, repeated, and/or substituted. Accordingly, embodiments of the invention should not be considered limited to the specific arrangements of modules shown in FIG. 2.

As shown in FIG. 2, the optical modulator circuit B (200) includes a p-n junction segment (PNJS) A (110) and a PNJS B (120) that are connected between an electrode A and electrode B. The optical modulator circuit B (200) further includes an optical waveguide A (130) and optical waveguide B (131) that superimpose the PNJS A (110) and PNJS B (120). In one or more embodiments, the optical modulator circuit B (200) is substantially the same as the optical modulator circuit A (100) depicted in FIG. 1 above with the exception that the NMDs are replaced by p-n junctions.

Specifically in the optical modulator circuit B (200), a PNJS is an optoelectronic component having a modulating p-n junction (MPNJ) and a dummy p-n junction (DPNJ) connected in opposite directions at the bias voltage connection of the PNJS. As used herein, the direction of a p-n junction points from the p-type region to the n-type region. Within the PNJS, the MPNJ and DPNJ are electrically connected in series as either a pnnp segment or a nppn segment. In other words, the PNJS may have one of two possible electrical connection sequences (i.e., pnnp sequence, nppn sequence). The PNJS of the pnnp sequence (i.e., a pnnp segment) has the n-type regions of the two p-n junctions electrically connected together. The PNJS of the nppn sequence (i.e., a nppn segment) has the p-type regions of the two p-n junctions electrically connected together.

In one or more embodiments of the invention, within one or more PNJS of the optical modulator circuit B (200), the DPNJ includes substantially larger capacitance than the MPNJ. For example, the PNJS A (110) includes a MPNJ A (101), connected to the electrode A, in series with a DPNJ A (202) connected to the electrode B. In one or more embodiments, the capacitance of the DPNJ A (202) is at least 10 times larger than the capacitance of the MPNJ A (101). Further, the PNJS B (120) includes a DPNJ B (203), connected to the electrode A, in series with a MPNJ B (104) connected to the electrode B. In one or more embodiments, the capacitance of the DPNJ B (203) is at least 10 times larger than the capacitance of the MPNJ B (104). Further, the PNJS A (110) and PNJS B (120) have the same electrical connection sequence (i.e., pnnp sequence).

In one or more embodiments, the optical modulator circuit B (200) is fabricated in silicon as a Mach-Zehnder (MZ) modulator used for light modulation in optical telecommunication applications. Unlike lithium niobate or other material that have electro-optic properties suitable for optical signal modulation, modulation in silicon optical waveguide is achieved based on the dependency of the refractive index to the free carrier density in the depletion region. In a silicon MZ modulator, the p-n junction is located in the silicon optical waveguide and modulation of the depletion width of this p-n junction affects an overlapping portion of the optical mode propagating in the optical waveguide. By applying a time-varying reverse voltage, the depletion region of the p-n junction (in particular, the free carrier density) may be modulated leading to a modulation of the refractive index and to a modulation of the phase of the light propagating in the optical waveguides. In one or more embodiments, the direct current (DC) portion of the time-varying reverse voltage is supplied by the bias voltage while the alternating current (AC) portion of the time-varying reverse voltage is supplied by the modulating voltage.

For operation at high frequency (i.e. 10's of GHz (gigahertz)), the MZ modulator arms are connected to radio frequency (RF) traveling-wave electrodes acting as RF transmission lines. The traveling-wave RF electrodes are elongated electrodes connected to p-n junctions for transmitting the modulation voltage(s). By way of this connection, the capacitance of the p-n junctions adds to the capacitance of the elongated electrodes, which is referred to as the capacitance loading. The capacitance loading results in a characteristic impedance matching with respect to the input driver circuit. In addition, the capacitance loading results in a group velocity matching with respect to the optical waves propagating in the optical waveguides.

The p-n junctions of the MZ modulator may be divided in segments that connect periodically (or at specific locations) to the RF traveling-wave electrodes to receive the modulation voltage from the input driver circuit. In other words, the RF traveling-wave electrodes propagate the input data as a RF traveling-wave to multiple PNJSs (e.g., PNJS A (110), PNJS B (120)) along the length of the MZ modulator arms (i.e., arm A and arm B). In particular, the RF traveling-wave is propagated along the length of the MZ modulator arms in a push-pull operation where the phase changes of the optical signal in both arms are in opposite directions. The push-pull operation reduces frequency chirp in the optical signal output of the MZ modulator. In one or more embodiments, a single input driver circuit is advantageously used to drive input data (i.e., time-varying modulating voltage) to both MZ modulator arms connected by PNJSs. This circuit configuration is a series-push-pull (SPP) configuration.

Figure 3B:
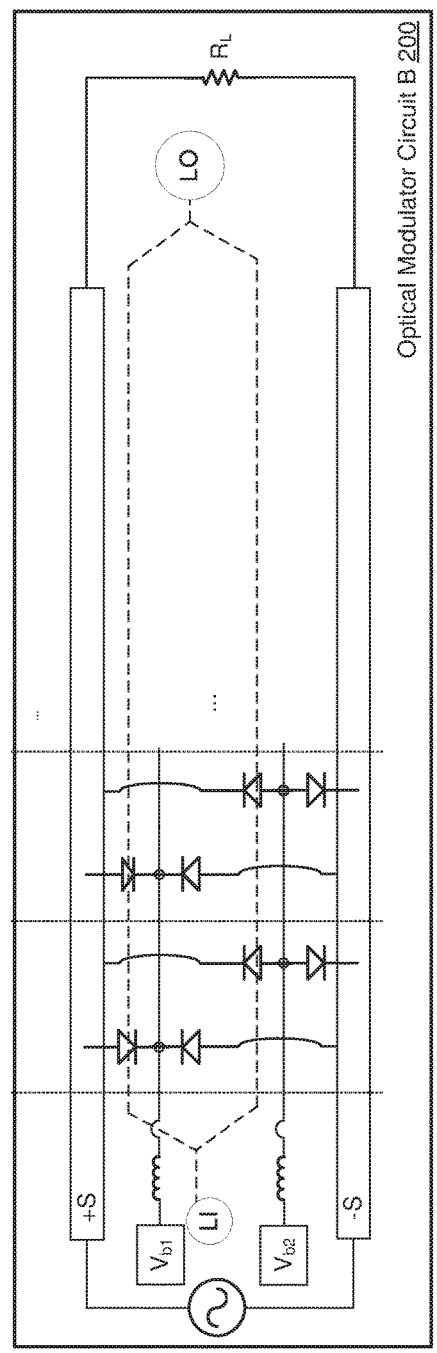

FIGS. 3A and 3B show two variations of the optical modulator circuit B (200) depicted in FIG. 2 above based on the legend (1000). In one or more embodiments of the invention, one or more of the elements shown in FIGS. 3A and 3B may be omitted, repeated, and/or substituted. Accordingly, embodiments of the invention should not be considered limited to the specific arrangements of modules shown in FIGS. 3A and 3B.

As shown in FIG. 3A, the PNJSs (e.g., PNJS A (110), PNJS B (120), PNJS C (130), PNJS D (140), etc.) are disposed adjacent to one another in a sequence and are located at different longitudinal distances from the optical signal input of the optical modulator circuit B (200). In the embodiments where the optical modulator circuit B (200) is an optoelectronic integrated circuit, the p-type and n-type regions of the PNJSs are fabricated in silicon layers and connected to the electrode A and electrode B using metallic structures such as, for example, metal traces and vertical metallic vias (i.e., contact vias). The electrode A, electrode B, and metallic structure are fabricated using one or more metal layers that may also be used as metal bridges (e.g., metal bridge A (300), metal bridge B (310), etc.) that may cross over the p-type and n-type regions of the PNJSs.

In one or more embodiments, based on the legend (1000) depicted in FIG. 2 above, the PNJS A (110) is connected to the electrode B via the metal bridge A (300) that may cross over the PNJS B (120). Similarly, the PNJS B (120) is connected to the electrode A via the metal bridge B (310) that may cross over the PNJS A (110). In particular, the metal bridge A (300) and metal bridge B (310) allow the PNJS A (110) and PNJS B (120) to overlap along the longitudinal direction, i.e., the direction of optical signal propagation in the optical modulator circuit B (200). The overlap is denoted by the opposing arrows and illustrated in FIG. 4 below.

FIG. 3B shows a different variation of the optical modulator circuit B (200) than FIG. 3A. While the PNJSs depicted in FIG. 3A above are the same pnnp segments, the PNJSs depicted in FIG. 3B alternate between a pnnp segment and a nppn segment, using different polarities for the bias voltage A and bias voltage B. In particular, the pnnp segments are biased using a positive bias voltage A while the nppn segments are biased using a negative bias voltage B.

Figure 4:
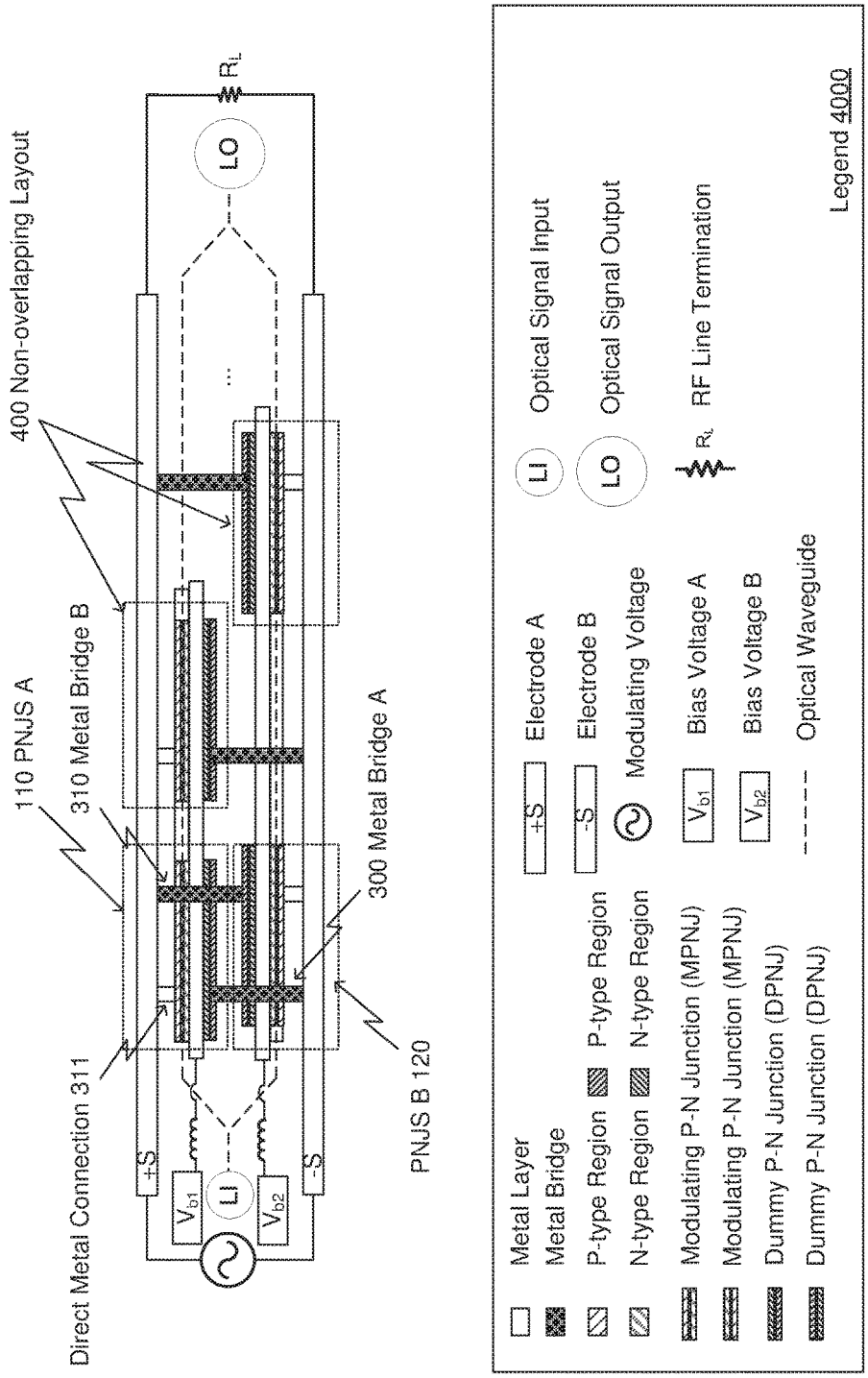

FIG. 4 shows a physical layout of the optical modulator circuit B (200) based on the schematic diagram depicted in FIG. 3A above. In particular, the physical layout of the optical modulator circuit B (200) is depicted according to the legend (4000). In one or more embodiments of the invention, one or more of the elements shown in FIG. 4 may be omitted, repeated, and/or substituted. Accordingly, embodiments of the invention should not be considered limited to the specific arrangements of modules shown in FIG. 4.

As shown in FIG. 4, the PNJS A (110) is connected to the electrode B via the metal bridge A (300) that crosses over the PNJS B (120). Similarly, the PNJS B (120) is connected to the electrode A via the metal bridge B (310) that crosses over the PNJS A (110). Consistent with the description of FIG. 3A above, the PNJS A (110) and PNJS B (120) overlap each other along the longitudinal direction of the optical modulator circuit B (200) and is referred to as an overlapping layout. In particular, the overlapping layout of the PNJS A (110) and PNJS B (120) occupy less longitudinal distance than that occupied by a non-overlapping layout (e.g., non-overlapping layout (400)). In one or more embodiments, the optical modulator circuit B (200) may be based on the overlapping layout and not include the non-overlapping layout. In one or more embodiments, the optical modulator circuit B (200) may be based on a combination of the overlapping layout and the non-overlapping layout.

Figure 5:
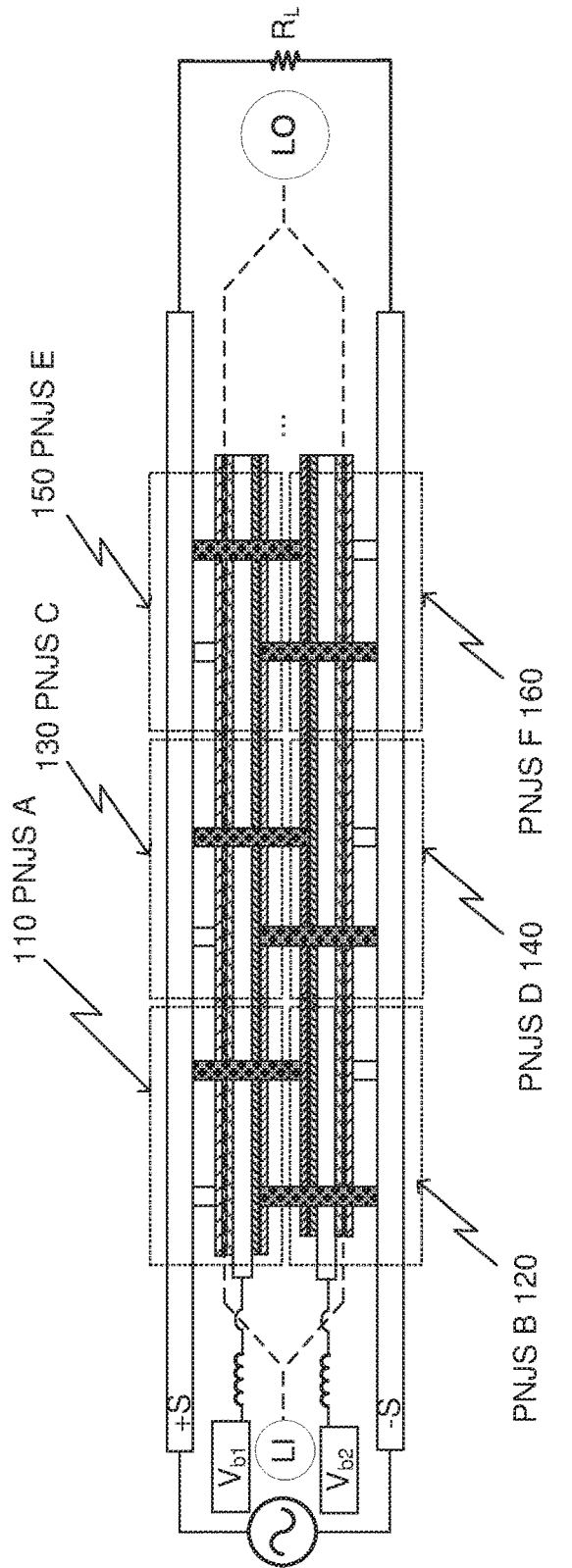

Further as shown in FIG. 4, both MPNJs and DPNJs are under the metal bridges. Accordingly, the MPNJs and DPNJs may not be segmented into individual PNJSs. In other words, the p-type and n-type regions of the PNJSs may be contiguous along the longitudinal distance. The contiguous p-type and n-type regions are then connected to the electrode A or to the electrode B at periodic intervals using the direct metal connections (e.g., direct metal connection (311)) and metal bridge connections (e.g., metal bridge A (300), metal bridge B (310)), as appropriate. As an example, FIG. 5 shows the variation of FIG. 4 with contiguous p-type and n-type regions. In particular, the PNJS A (110), PNJS C (130), and PNJS E (150) share one set of contiguous p-type and n-type regions while the PNJS B (120), PNJS D (140), and PNJS F (160) share another set of contiguous p-type and n-type regions.

Figure 6:
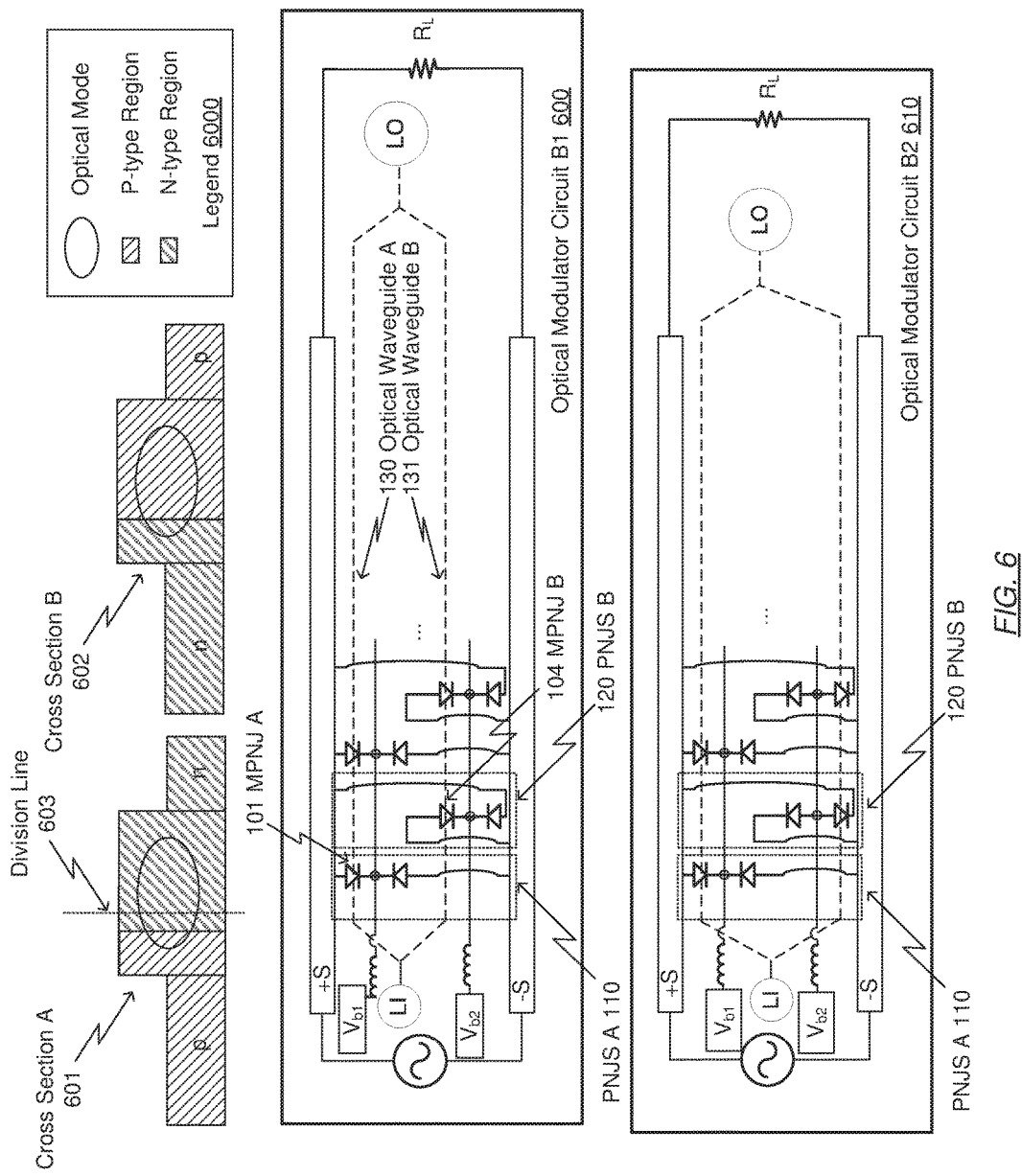
Figure 7:
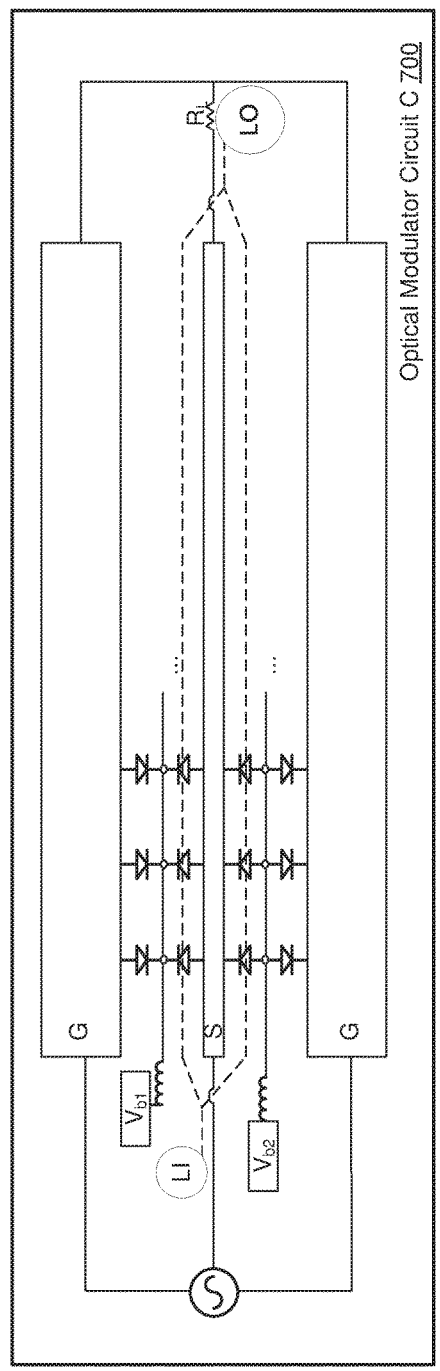
Figure 8:
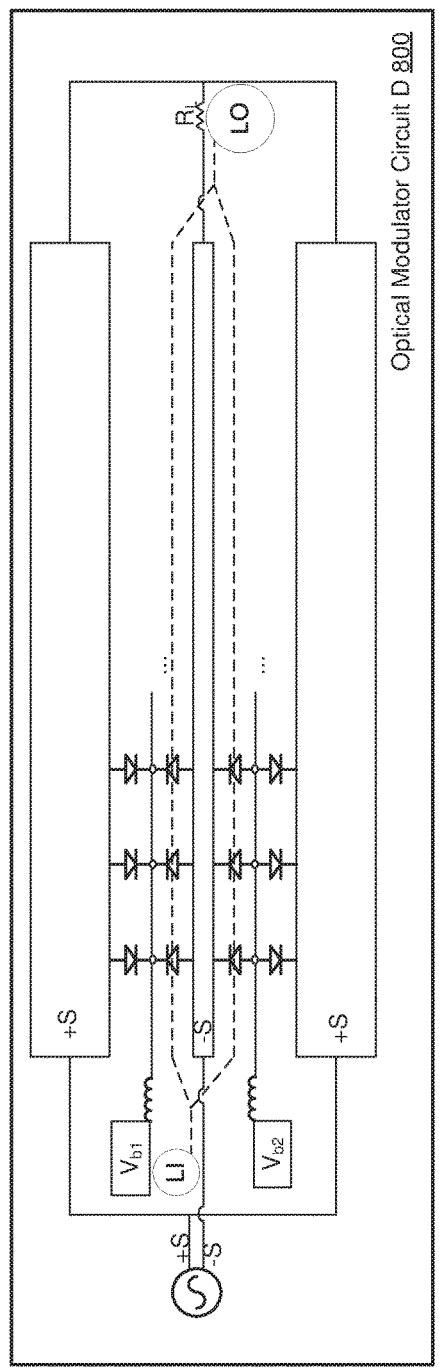

FIGS. 6-8 show further variations of the optical modulator circuit B (200) depicted in FIG. 3A above. As shown in FIG. 6, the optical modulator circuit B1 (600) and optical modulator circuit B2 (610) are substantially the same as the optical modulator circuit B (200) depicted in FIG. 3A above with the exception of the PNJSs connected to the electrode B. Specifically, the physical layout directions of the p-n junctions of the PNJSs connected to the electrode B are selected to reduce the effect of misalignment of lithographic masks during the integrated circuit fabrication. In the discussion below, the relative positions and directions of components depicted in FIGS. 3 and 6-8 correspond to physical layout positions and directions on an integrated circuit chip.

For example, the MPNJs (i.e., the p-n junctions superimposed by the optical waveguides) of the PNJS A (110) and PNJS B (120) depicted in FIG. 3A above have opposite p-n junction direction. In contrast, the MPNJs of the PNJS A (110) and PNJSB (120) depicted in the optical modulator circuit B1 (600) and optical modulator circuit B2 (610) have the same p-n junction direction. Specifically, the MPNJ A (101) and MPNJ B (104) have the same direction and the same cross section A (601) based on the legend (6000). Within the cross section A (601), the interface between the p-type and n-type regions defines the p-n junction, while the rib waveguide (i.e., thicker material layer) defines the optical mode. For example, a division line (603) may be specified by a circuit designer in the layout of the optical modulator circuit to divide the optical mode into portions overlapped by doping regions of the opposite types. In other words, the division line (603) is specified by the circuit designer to coincide with the p-n junction. The misalignment corresponds to a shift between the actual fabricated p-n junction and the division line (603) of the optical mode. In particular, the misalignment is caused by the shift between a dopant implant lithographic mask and a lithographic mask used to define the rib waveguide. Due to the misalignment, the optical mode interacts with different amount of p-type region and n-type region. Because the MPNJ A (101) and MPNJ B (104) have the same direction, both the optical waveguide A (130) and optical waveguide (131) still interact with the same amount of p-type material even under the misalignment condition. Similarly, the optical waveguide A (130) and optical waveguide B (131) still interact with the same amount of n-type material even under the misalignment condition. Therefore, lithographic mask misalignment during fabrication between p-n junction and optical waveguide have substantially same impact on both optical waveguides. Accordingly, misalignment induced modulation imbalance between two waveguides is reduced. A comparison between the cross section A (601) and cross section B (602) shows that the two optical waveguides would interact with a different amount of p-type region under the misalignment condition if the two MPNJs are disposed in opposite directions.

While the PNJSs depicted in FIG. 3A above are the same pnnp segments, the PNJSs of the optical modulator circuit B2 (610) alternate between a pnnp segment and a nppn segment, using different polarities for the bias voltage A and bias voltage B. In particular, the pnnp segments are biased using a positive bias voltage A while the nppn segments are biased using a negative bias voltage B. Although specific physical layout directions of the p-n junctions of the PNJSs are shown in the optical modulator circuit B1 (600) and optical modulator circuit B2 (610) to reduce the effect of misalignment of lithographic masks during integrated circuit fabrication, other p-n junctions connection schemes to cancel the effect of masks misalignment also exist and may be used in combination of the NMD to improve the efficiency of the optical modulator circuit.

In one or more embodiments, the electrode A and electrode B described above form a coplanar strip (CPS) waveguide (i.e., two parallel conducting tracks). FIGS. 7 and 8 show an optical modulator circuit C (700) and an optical modulator circuit D (800) making use of a coplanar waveguide (CPW) having three parallel conducting metal traces as the RF traveling-electrode. In the CPW configuration, PNJSs superimposed by the same optical waveguide are disposed on the same side of the CPW center electrode. In other words, PNJSs superimposed by different optical waveguides are disposed on different sides of the CPW center electrode. The CPW configuration does not use the metal bridges. Furthermore, the MPNJs superimposed by different optical waveguides have the same p-n junction direction. Therefore, lithographic mask misalignment during fabrication between p-n junction and optical waveguide have substantially same impact on both optical waveguides. Accordingly, misalignment induced modulation imbalance between two waveguides is reduced.

Although specific number of PNJSs of the optical modulator circuit are shown in each of FIGS. 1-8, any number of PNJSs may exist as represented by the black collinear dots in the figures. Further, in each of FIGS. 1-8, all n-type regions may be collectively exchanged with p-type regions, and vice versa for all the p-n junctions without loss of generality.

Figure 9:
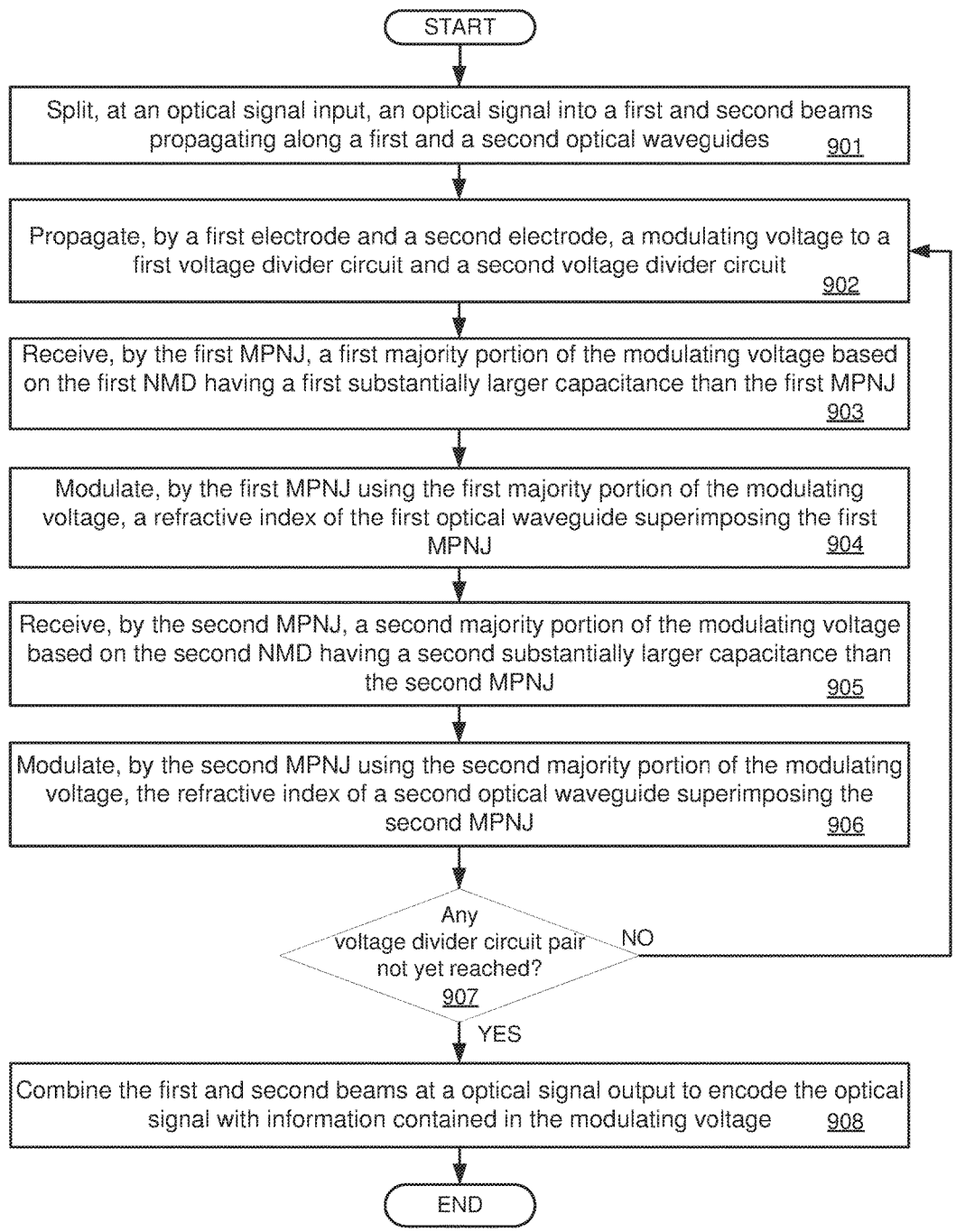
FIG. 9 shows a method flowchart in accordance with one or more embodiments of the invention.

FIG. 9 shows a flowchart in accordance with one or more embodiments. In one or more embodiments, the method may be based on one or more optical modulator circuits depicted in FIGS. 1-8 above. One or more steps shown in FIG. 9 may be omitted, repeated, and/or performed in a different order among different embodiments of the invention. Accordingly, embodiments of the invention should not be considered limited to the specific number and arrangement of steps shown in FIG. 9.

Initially, in Step 901, an optical signal is split at an optical signal input into a first beam and a second beam. The first beam and the second beam propagate separately along a first optical waveguide and a second optical waveguide, respectively. In one or more embodiments, the first optical waveguide and the second optical waveguide form two arms of an interferometer.

In Step 902, a modulating voltage is propagated, by a first electrode and a second electrode, to a first voltage divider circuit and a second voltage divider circuit. In the first voltage divider circuit, the modulating voltage is propagated to a first MPNJ by the first electrode and propagated to a first NMD by the second electrode. In contrast, in the second voltage divider circuit, the modulating voltage is propagated to a second NMD by the first electrode and propagated to a second MPNJ by the second electrode. In one or more embodiments, the modulating voltage is propagated to a sequence of voltage divider circuits by using the first electrode and the second electrode as a radio frequency transmission line.

In Step 903, a first majority portion of the modulating voltage is received by the first MPNJ based on the first NMD having a first substantially larger capacitance than the first MPNJ. In one or more embodiments, the first voltage divider circuit divides the modulating voltage based on a p-n junction capacitance of the first MPNJ and the first substantially larger capacitance of the first NMD.

In Step 904, the refractive index of the first optical waveguide superimposing the first MPNJ is modulated by the first MPNJ using the first majority portion of the modulating voltage. Accordingly, the first beam is modulated based on the refractive index modulation of the first optical waveguide.

In Step 905, a second majority portion of the modulating voltage is received by the second MPNJ based on the second NMD having a second substantially larger capacitance than the second MPNJ. In one or more embodiments, the second voltage divider circuit divides the modulating voltage based on a p-n junction capacitance of the second MPNJ and the second substantially larger capacitance of the second NMD.

In Step 906, the refractive index of the second optical waveguide superimposing the second MPNJ is modulated by the second MPNJ using the second majority portion of the modulating voltage. Accordingly, the second beam is modulated based on the refractive index modulation of the second optical waveguide.

In Step 907, a determination is made as to whether any voltage divider circuit pair has not been reached by the modulating voltage. If the determination is negative, i.e., at least one voltage divider circuit pair remains to be reached by the modulating voltage, the method returns to Step 902. If the determination is positive, i.e., no more voltage divider circuit pair remains reached by the modulating voltage, the method proceeds to Step 908.

In Step 908, the optical signal is encoded based on the MPNJs of the sequence of voltage divider circuits modulating the refractive indices of the first and second optical waveguides. In particular, the optical signal is encoded with information contained in the modulating voltage. In one or more embodiments where the first and second optical waveguides form the interferometer, the first beam and the second beam are combined at an optical signal output to encode the optical signal.

Figure 10:
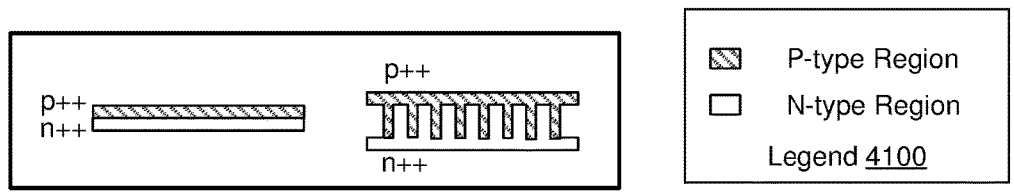
FIGS. 10, 11, and 12 show examples in accordance with one or more embodiments of the invention.
Figure 11:
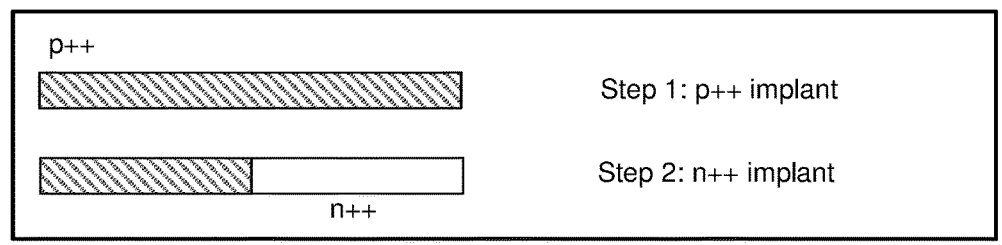
Figure 12:
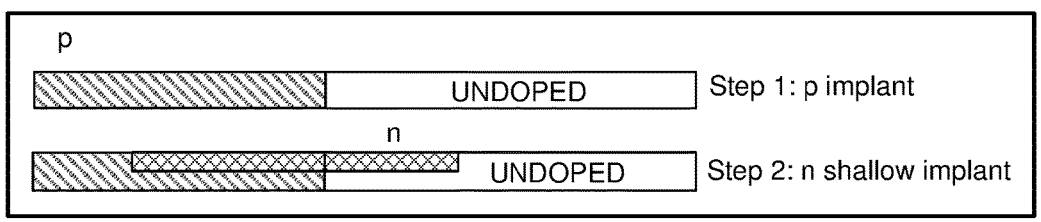

FIGS. 10-12 show examples of DPNJs used in one or more optical modulator circuits depicted in FIGS. 2-8 above. In particular, the examples of DPNJs are depicted according to the legend (4100). In one or more embodiments of the invention, one or more of the elements shown in FIGS. 10-12 may be omitted, repeated, and/or substituted. Accordingly, embodiments of the invention should not be considered limited to the specific arrangements of modules shown in FIGS. 10-12.

As noted above in the description of Eq. 1, the capacitance of a PNJS is dominated by the capacitance of the MPNJ when $C_{NMD} \gg C_{MPNJ}$. Accordingly, the capacitance of the DPNJ may be arbitrarily large with no adverse impact on the modulation speed. Additionally, the MPNJs in both arms of the interferometer are in parallel to each other across the RF travelling-wave electrode. For the example optical modulator circuit depicted in FIG. 5 above, the MPNJs load the RF transmission line with a capacitance that is twice that of the MPNJ, per unit length. The unloaded RF transmission line is designed to provide (i) an impedance matching of the modulating voltage driver, and (ii) a RF-wave velocity matching of the optical wave when loaded with the two MPNJs in parallel, in order to be able to operate at high bandwidth.

Access resistance to the p-n junctions in MPNJs is an important parameter affecting the RF bandwidth. The access resistance of the MPNJ is mainly due to the optical waveguide structure for optical confinement of the optical wave. The MPNJs are located across a rib waveguide with a thicker silicon region in the center of the optical waveguide and thinner regions on both sides (e.g., as depicted in FIG. 6 above). The thinner regions may add resistance and degrade the RC bandwidth of the optical modulator. A conventional SPP modulator has two such diodes in series. The DPNJs used in one or more optical modulator circuits depicted in FIGS. 2-8 above do not confine any optical wave and may have thicker regions to reduce the access resistance.

The DPNJs may be realized using various approaches. FIG. 10 shows the use of larger p++ and n++ doping concentrations to increase the p-n junction capacitance. As used herein, p++ and n++ are the dopant concentrations used for highly doped (e.g., larger than $10^{19}$ ions/cm$^3$) p-type and n-type silicon regions, respectively. An interleaved p-n junction structure with larger interface surface may also be used to increase the capacitance.

Misalignment of the p and n doped regions (or p++ and n++) may lead to a gap or an overlap between the p-type and n-type regions. A gap directly leads to an over-sized depletion region and to a smaller capacitance. An overlap creates an equivalent intrinsic region and decrease the resulting capacitance. FIGS. 11 and 12 show methods to mitigate the misalignment artifact. As illustrated in FIG. 11, a first implantation is realized using p++ dopant to provide a large final concentration in the p-type region. A second implant using the n++ dopant is realized with dose and energy sufficient to overwhelm the first implant and provide a high concentration of n-type dopant in the second implant region. In other words, the dose of the n++ dopant is much larger than that of the p++ dopant. As the exact location of p-n junction is not important for the DPNJs, juxtaposed lateral p-n junctions may be realized in such manner to form the DPNJs so as to eliminate the aforementioned gap or overlap.

FIG. 12 shows another method, to realize a vertical p-n junction in contrast to the lateral p-n junction described previously, using p and n-type implants. A first implant is made with p-type dopant. A second implant is made with n-type dopant on a shallow layer on top of the p-type implanted region. In order that the top surface be n-type doped, the implant dose is large enough to substantially overwhelm the effect of the p-type dopant in the shallow layer. The capacitance of the p-n junction may be increased by using large dopant concentration and/or increase the surface of the overlapping shallow layer.

Based on the foregoing, by alternating two types of p-n junction segments along the longitudinal direction and employing non-modulating devices with large capacitance, each type of p-n junction segment modulates one arm of the optical modulator at substantially the same longitudinal location using substantially the full magnitude of the modulating voltage. Accordingly, the modulating voltage magnitude to achieve a particular amount of optical signal modulation (e.g., phase shift) over a given longitudinal distance may be reduced by a factor of 2. Equivalently, the longitudinal distance to achieve a particular amount of optical signal modulation (e.g., phase shift) using a given modulating voltage may be reduced by a factor of 2. In other words, the amount of optical signal modulation (e.g., phase shift) over a given longitudinal distance and using a given modulating voltage may be increased by a factor of 2. Accordingly, embodiments described above may improve the optical modulator efficiency by a factor of 2.

Embodiments of the invention may be advantageously applied to a reverse bias operation of the p-n junctions as well as a forward bias operation, such as used in forward conduction or in current injection.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An optical modulator circuit, comprising:
   a first electrode and a second electrode;
   a first p-n junction segment (PNJS) comprising a first modulating p-n junction (MPNJ) in series with a first non-modulating device (NMD), wherein the first MPNJ and the first NMD are connected to the first electrode and the second electrode, respectively;
   a second PNJS comprising a second NMD in series with a second MPNJ, wherein the second NMD and the second MPNJ are connected to the first electrode and the second electrode, respectively; and
   a first optical waveguide and a second optical waveguide that superimpose the first MPNJ and the second MPNJ, respectively, wherein the first MPNJ and the second MPNJ are configured to modulate a refractive index of the first optical waveguide and the second optical waveguide,
   wherein the first electrode, the second electrode, the first optical waveguide, and the second optical waveguide are substantially parallel to each other along a direction of optical signal propagation.

2. The optical modulator circuit of claim 1, further comprising:
   an optical signal input configured to split an optical signal into a first beam and a second beam propagating along the first optical waveguide and the second optical waveguide, respectively, to an optical signal output; and
   the optical signal output configured to combine the first beam and the second beam for generating an encoded optical signal,
   wherein the first beam is modulated based on the refractive index of the first optical waveguide, and
   wherein the second beam is modulated based on the refractive index of the second optical waveguide.

3. The optical modulator circuit of claim 1, further comprising:
   a termination resistor connected, at the optical signal output, between the first electrode and the second electrode,
   wherein the first electrode and the second electrode are configured to propagate a modulating voltage to the first PNJS and the second PNJS, and
   wherein the modulating voltage is terminated at the optical signal output by the termination resistor.

4. The optical modulator circuit of claim 2,
   wherein the first beam propagates in a first optical mode, the second beam propagates in a second optical mode, the first optical mode is defined by a rib structure of the first optical waveguide, and the second optical mode is defined by a rib structure of the second optical waveguide,
   wherein the first optical mode superimposes the first MPNJ with a first misalignment,
   wherein the second optical mode superimposes the second MPNJ with a second misalignment, and
   wherein the first misalignment of the first MPNJ and the second misalignment of the second MPNJ substantially match each other to improve a balance between the first MPNJ modulating the refractive index of the first optical waveguide and the second MPNJ modulating the refractive index of the second optical waveguide.

5. The optical modulator circuit of claim 1,
   wherein the first PNJS further comprises a first metal bridge, and wherein the second PNJS further comprises a second metal bridge, and
wherein the first metal bridge and the second metal bridge are configured to allow the first PNJS and the second PNJS to overlap along the direction of optical signal propagation.

6. The optical modulator circuit of claim 1,
wherein the first electrode and the second electrode comprise a coplanar strip waveguide as a radio frequency (RF) traveling-electrode for propagating a modulating voltage.

7. The optical modulator circuit of claim 1,
wherein each NMD comprises a dummy p-n junction having an interleaved p-n junction structure to increase an interface surface of the dummy p-n junction,
wherein each NMD comprises a substantially larger capacitance than the corresponding MPNJ based at least on the increased interface surface.

8. The optical modulator circuit of claim 1,
wherein each NMD comprises a dummy lateral p-n junction formed by a first ion implantation and a second ion implantation that use opposite dopant types with concentration exceeding $10^{19}$ ions/cm$^3$, and
wherein each NMD comprises a substantially larger capacitance than the corresponding MPNJ based at least on the concentration exceeding $10^{19}$ ions/cm$^3$.

9. An optical modulator circuit, comprising:
a first electrode, a second electrode, and a center electrode;
a first p-n junction segment (PNJS) comprising a first modulating p-n junction (MPNJ) in series with a first dummy p-n junction (DPNJ), wherein the first MPNJ and the first DPNJ are connected to the center electrode and the first electrode, respectively;
a second PNJS comprising a second DPNJ in series with a second MPNJ, wherein the second MPNJ and the second DPNJ are connected to the center electrode and the second electrode, respectively; and
a first optical waveguide and a second optical waveguide that superimpose the first MPNJ and the second MPNJ, respectively, wherein the first MPNJ and the second MPNJ are configured to modulate a refractive index of the first optical waveguide and the second optical waveguide,
wherein the first electrode, the second electrode, the first optical waveguide, and the second optical waveguide are substantially parallel to each other along a direction of optical signal propagation.

10. The optical modulator circuit of claim 9, further comprising:
a termination resistor connected, at the optical signal output, between the first electrode and the second electrode,
wherein the first electrode, the second electrode, and the center electrode are configured to propagate a modulating voltage to the first PNJS and the second PNJS, and
wherein the modulating voltage is terminated at the optical signal output by the termination resistor.

11. The optical modulator circuit of claim 10,
wherein the first electrode, the second electrode, and the center electrode comprise a coplanar waveguide as a radio frequency (RF) traveling-electrode for propagating the modulating voltage.

12. The optical modulator circuit of claim 10, further comprising:
a differential modulating voltage source configured to drive the modulating voltage between the center electrode and a common node connecting the first electrode and the second electrode.

13. The optical modulator circuit of claim 10, further comprising:
a single-ended modulating voltage source configured to drive the modulating voltage between the center electrode and the first electrode; and
drive the modulating voltage between the center electrode and the second electrode.

14. The optical modulator circuit of claim 9, further comprising:
an optical signal input configured to split an optical signal into a first beam and a second beam propagating along the first optical waveguide and the second optical waveguide, respectively, to an optical signal output; and
the optical signal output configured to combine the first beam and the second beam for generating an encoded optical signal,
wherein the first beam is modulated based on the refractive index of the first optical waveguide, and
wherein the second beam is modulated based on the refractive index of the second optical waveguide.

15. The optical modulator circuit of claim 14,
wherein the first beam propagates in a first optical mode, the second beam propagates in a second optical mode, the first optical mode is defined by a rib structure of the first optical waveguide, and the second optical mode is defined by a rib structure of the second optical waveguide,
wherein the first optical mode superimposes the first MPNJ with a first misalignment,
wherein the second optical mode superimposes the second MPNJ with a second misalignment, and
wherein the first misalignment of the first MPNJ and the second misalignment of the second MPNJ substantially match each other to improve a balance between the first MPNJ modulating the refractive index of the first optical waveguide and the second MPNJ modulating the refractive index of the second optical waveguide.

16. The optical modulator circuit of claim 9,
wherein the first DPNJ comprises a dummy p-n junction formed by a first ion implantation and a second ion implantation that use opposite dopant types with concentration exceeding $10^{19}$ ions/cm$^3$,
wherein the dummy p-n junction comprises at least one selected from a group consisting of a lateral p-n junction and a vertical p-n junction, and
wherein the first NMD comprises a substantially larger capacitance than the first MPNJ based on at least one selected from a group consisting of the concentration exceeding $10^{19}$ ions/cm$^3$.

17. The optical modulator circuit of claim 10,
wherein the first electrode and the second electrode are configured to propagate the modulating voltage to the first PNJS and the second PNJS for modulating the refractive index, and
wherein the first optical waveguide and the second optical waveguide are configured to propagate an optical signal that is encoded, via the refractive index, with information contained in the modulating voltage.

18. The optical modulator circuit of claim 1,
wherein each NMD comprises a dummy vertical p-n junction formed by a first ion implantation and a second ion implantation that use opposite dopant types with concentration exceeding $10^{19}$ ions/cm$^3$, wherein the second ion implantation has a depth that is less than the first ion implantation to increase an interface surface of the dummy vertical p-n junction, and wherein each NMD comprises a substantially larger capacitance than the corresponding MPNJ based on at least one selected from a group consisting of the concentration exceeding $10^{19}$ ions/cm$^3$ and the increased interface surface.

19. The optical modulator circuit of claim 18, the refractive index of each optical waveguide is modulated based on the substantially larger capacitance.

20. The optical modulator circuit of claim 3, wherein the first electrode and the second electrode are configured to propagate the modulating voltage to the first PNJS and the second PNJS for modulating the refractive index, and wherein the first optical waveguide and the second optical waveguide are configured to propagate an optical signal that is encoded, via the refractive index, with information contained in the modulating voltage.

\* \* \* \* \*